(12) United States Patent
Stech

(10) Patent No.: US 6,651,689 B1
(45) Date of Patent: Nov. 25, 2003

(54) VALVE STEM ASSEMBLY FOR A PNEUMATIC TIRE

(75) Inventor: Clyde G. Stech, Austin, TX (US)

(73) Assignee: Reineke Company Inc., Ashland, OH (US)

( * ) Notice: Subject to any disclaimer, the term of this patent is extended or adjusted under 35 U.S.C. 154(b) by 0 days.

(21) Appl. No.: 09/664,245

(22) Filed: Sep. 18, 2000

(51) Int. Cl.[7] ............................................. F16K 15/20
(52) U.S. Cl. .................. 137/223; 137/231; 251/149.6; 251/293; 152/415
(58) Field of Search ................................ 137/223, 231; 251/293, 149.6; 152/416, 418, 415

(56) References Cited

U.S. PATENT DOCUMENTS

| | | | | |
|---|---|---|---|---|
| 1,430,461 A | * | 9/1922 | Michelin | 137/223 |
| 2,178,828 A | * | 11/1939 | Broecker | 137/223 |
| 2,508,503 A | * | 5/1950 | Doepke | 137/223 |
| 2,812,000 A | * | 11/1957 | Trinca | 137/223 |
| 3,315,695 A | * | 4/1967 | Boyer | 137/223 |
| 3,627,264 A | * | 12/1971 | Scherer | 251/366 |
| 3,863,697 A | * | 2/1975 | Brown | 152/427 |
| 4,445,527 A | * | 5/1984 | Leimbach | 137/226 |
| 4,995,417 A | * | 2/1991 | Naku | 137/231 |
| 5,016,668 A | * | 5/1991 | Nicolino et al. | 137/231 |
| 5,433,488 A | * | 7/1995 | Chiago | 285/148.19 |
| 5,450,886 A | * | 9/1995 | Girard | 152/427 |
| 5,765,601 A | * | 6/1998 | Wells et al. | 141/38 |
| 5,788,787 A | * | 8/1998 | Cucci | 152/415 |
| 5,816,284 A | * | 10/1998 | Lin | 137/223 |
| 5,954,081 A | * | 9/1999 | Everhard et al. | 137/68.23 |

* cited by examiner

*Primary Examiner*—John Rivell
(74) *Attorney, Agent, or Firm*—Walker & Jocke; Christopher L. Parmelee

(57) ABSTRACT

A valve stem assembly for use with a pneumatic tire includes a stem, a first quick couple connector and a second quick couple connector. The first quick couple connector is attached to the stem. The first quick couple connector includes a first valve therein. The second quick couple connector is detachably coupled with the first quick couple connector. The second quick couple connector opens the first valve when the first quick couple connector and the second quick couple connector are coupled together. The second quick couple connector includes a second valve therein.

26 Claims, 4 Drawing Sheets

VALVE STEM ASSEMBLY FOR A PNEUMATIC TIRE

BACKGROUND OF THE INVENTION

1. Field of the Invention.

The present invention relates to a valve stem assembly for a pneumatic tire, and, more particularly, to a valve stem assembly for use with a pneumatic tire inflation system.

2. Description of the Related Art.

A pneumatic tire typically is constructed as a tube or tubeless tire. Regardless of the particular type, the tire includes a stem which extends through the wheel. The stem has a valve core therein with a needle which is depressed by an air chuck when inflating the tire. The outside diameter of the stem closely mates with the air chuck to prevent air leakage during pressure filling of the tire.

It is also known to provide an automatic tire inflation system to maintain the air pressure within the tires of a motorized vehicle at a predetermined pressure level. For example, a semi-truck or bus may include a tire inflation system which is coupled to each of the wheels associated therewith. In the case of a semi-truck, the tires on the trailer pulled by the truck may also be coupled with the tire inflation system. Typically, air is supplied through an air conduit passing through the various axles to an external fitting on the hub of the axle. One or more air hoses are then coupled with the pneumatic tires carried by each axle. The air hoses are normally attached to the stem of each tire using a threaded fitting. The fitting typically includes hex lands on the outside periphery thereof such that a wrench or the like may be used to secure the air hose to the stem.

A problem with a stem and air hose assembly as described above is that tools are required to couple the air hose with the stem of the tire. Tools may not be available, and this procedure requires some time to accomplish. Additionally, the air tube or air inflation system coupled with the stem of the tire may leak or otherwise fail. Typically, no provisions are provided within the air hose to prevent leakage from the tire in the event of failure of the air hose or air inflation system.

What is needed in the art is a valve stem assembly which provides effective inflation of the tire and prevents leakage from the tire.

SUMMARY OF THE INVENTION

The present invention provides a valve stem assembly for use with a pneumatic tire which includes a first quick couple connector sealingly attached to a tire stem and a second quick couple connector detachably coupled with the first quick couple connector.

The invention comprises, in one form thereof, a valve stem assembly for use with a pneumatic tire. The valve stem assembly includes a stem, a first quick couple connector and a second quick couple connector. The first quick couple connector is attached to the stem. The first quick couple connector includes a first seal and a second seal each sealingly engaged with the stem. The second quick couple connector is detachably coupled with the first quick couple connector.

The invention comprises, in another form thereof, a valve stem assembly for use with a pneumatic tire. The valve stem assembly includes a stem, a first quick couple connector and a second quick couple connector. The first quick couple connector is attached to the stem. The first quick couple connector includes a first valve therein. The second quick couple connector is detachably coupled with the first quick couple connector. The second quick couple connector opens the first valve when the first quick couple connector and the second quick couple connector are coupled together. The second quick couple connector includes a second valve therein.

An advantage of the present invention is that the stem may be coupled with an automatic tire inflation system using the first and second quick couple connectors, without the use of tools.

Another advantage is that the first quick couple connector includes a redundant sealing arrangement for ensuring that leakage in the stem and the first quick couple connector does not occur.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
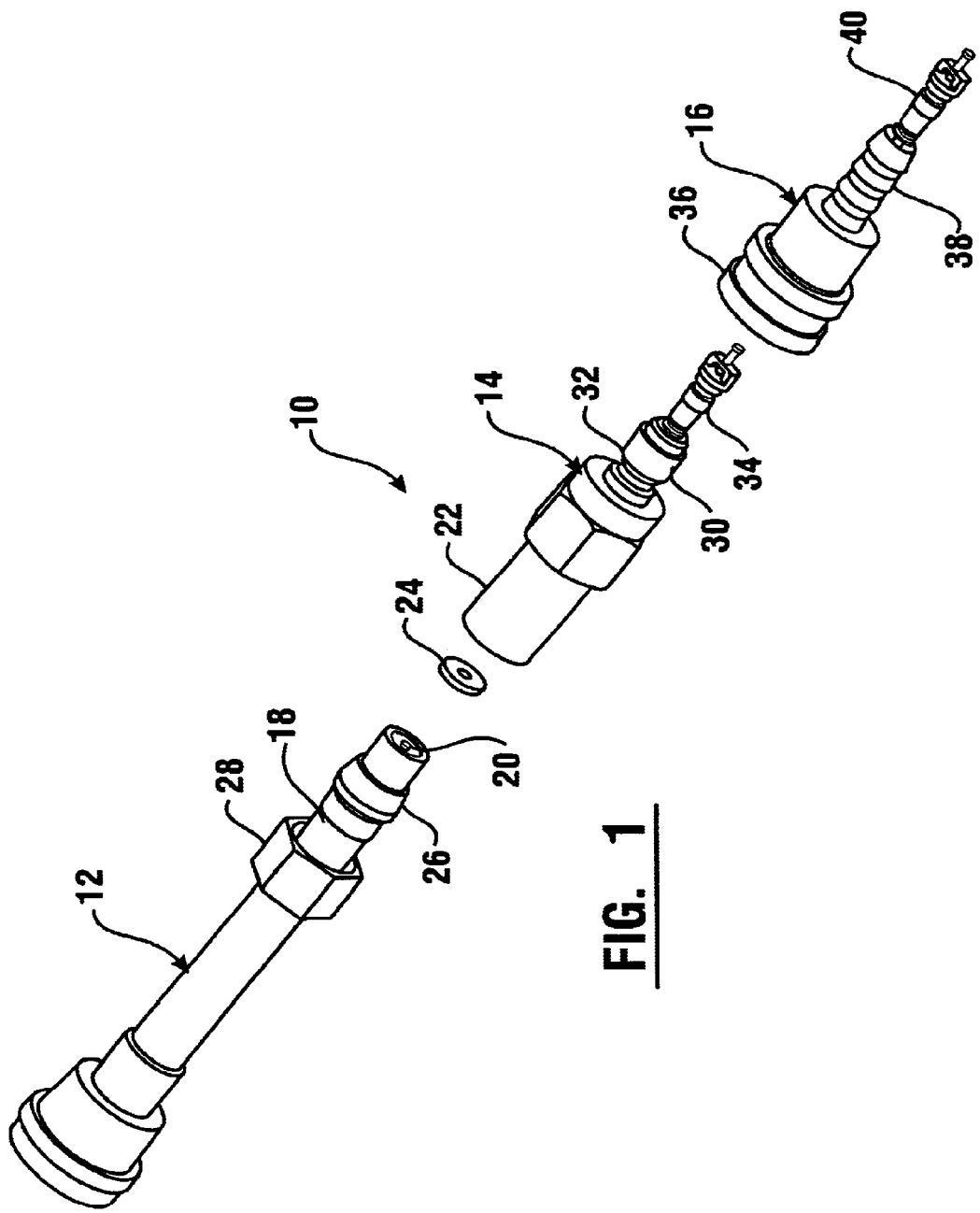
FIG. 1 is an exploded, perspective view of an embodiment of a valve stem assembly of the present invention.
Figure 2:
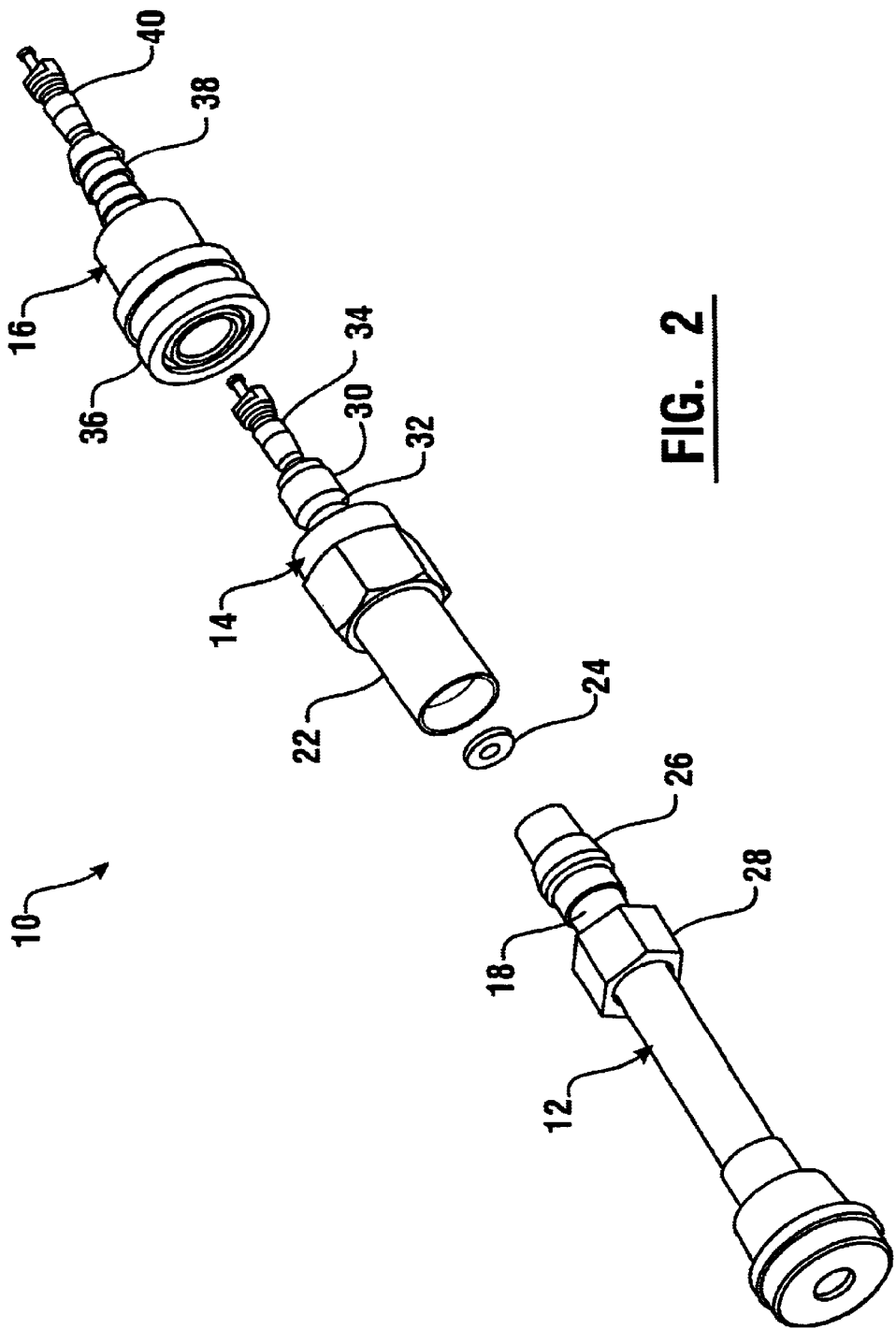
FIG. 2 is another exploded, perspective view of the valve stem assembly of FIG. 1.
Figure 3:
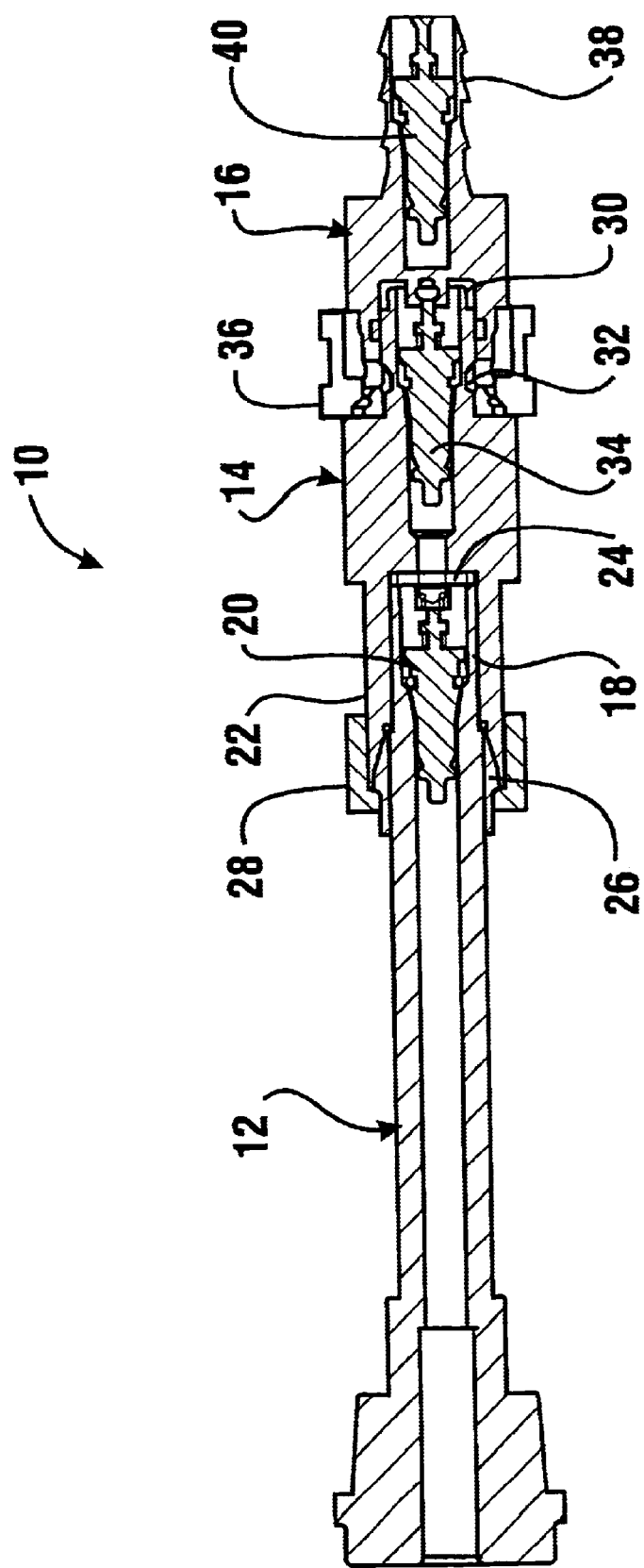
FIG. 3 is a side, sectional view of the valve stem assembly shown in FIGS. 1 and 2.
Figure 4:
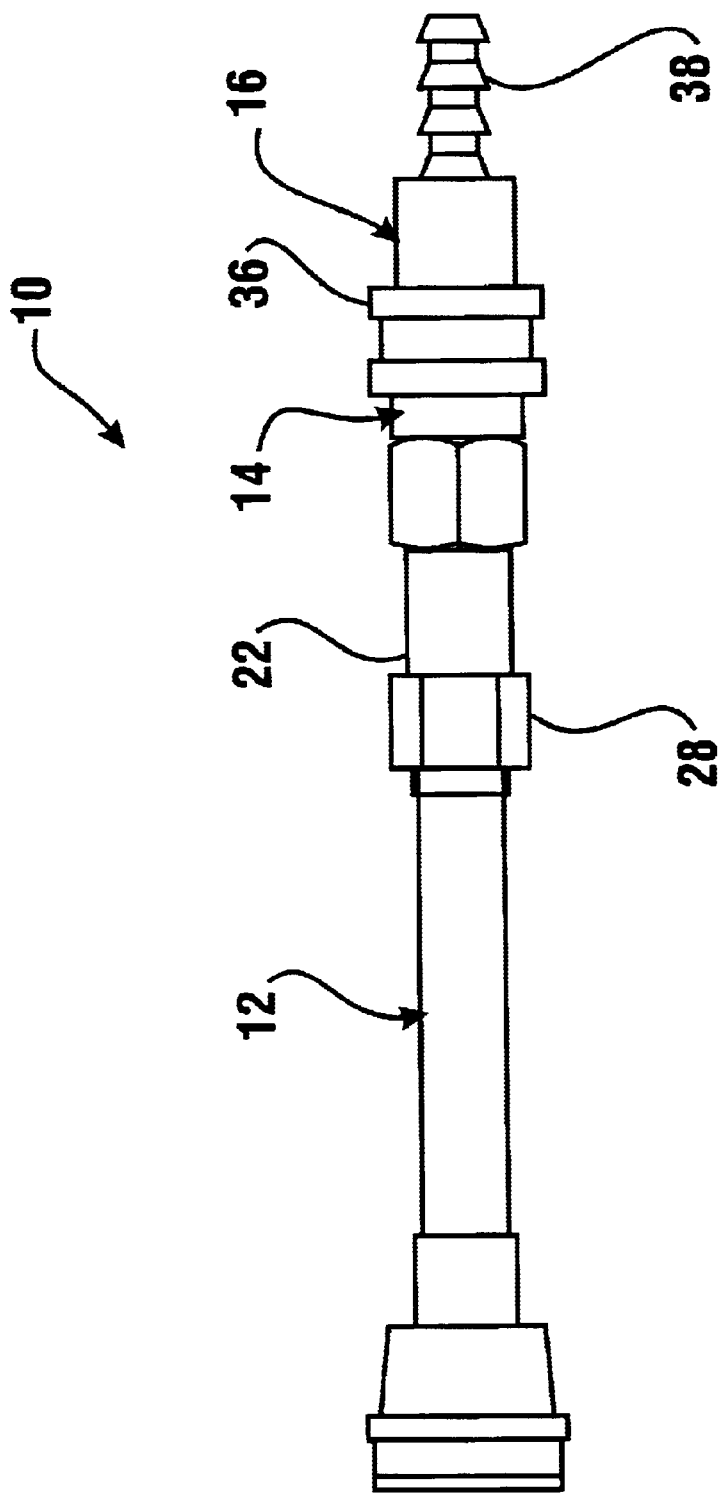
FIG. 4 is an assembled, side view of the valve stem assembly shown in FIGS. 1–3.

Referring now to the drawings, there is shown an embodiment of a valve stem assembly 10 of the present invention for use with a tire (not shown). Valve stem assembly 10 generally includes a stem 12, first quick couple connector 14 and second quick couple connector 16.

Stem 12 is configured for attachment with a pneumatic tire (such as a tubeless tire) or a tube for insertion within a tire, neither of which are shown. Stem 12 has a connection end 18 with an outside diameter of conventional configuration so that a standard air chuck may be coupled therewith for inflating the pneumatic tire. Stem 12 includes a valve 20 therein having a needle which is depressed in known manner to open valve 20 and thereby allow air to be pumped through stem 12 into the tire. In the embodiment shown, valve 20 is in the form of a 90 pound valve core. Connection end 18 may include external threads (not shown) for attachment with a conventional cap to prevent dirt or other debris from entering connection end 18 and interfering with operation of valve 20.

First quick couple connector 14 is attached to connection end 18 of stem 12. More particularly, first quick couple connector 14 includes a female end 22 which fits over connection end 18 of stem 12. First quick couple connector 14 includes redundant seals within female end 22 which provide reliable sealing with connection end 18 of stem 12.

To wit, female end 22 includes an axial seal 24 and a radial seal 26. Axial seal 24 is disposed at the end of the opening within female end 22 and engages the axial end face of connection end 18 of stem 12. Axial seal 24 is a deformable material allowing some axial movement of connection end 18 within female end 22, while still maintaining an effective seal. In the embodiment shown, axial seal 24 is constructed from Acetel, manufactured under the Trademark name DELREN by E.I. DuPont de Nemours. Other compressible materials may also be utilized. Radial seal 26 is positioned within an annular groove formed in the inside diameter of female end 22. Radial seal 26 is compressed in a radially inward direction by a compression nut 28 positioned around the outside of female end 22. Radial seal 26 may be of any radially compressive material, such as an elastomeric material, bronze material, etc. In the embodiment shown, radial seal 26 is likewise formed of DELREN™.

By providing both an axial seal 24 as well as a radial seal 26, sealing engagement between stem 12 and first quick couple connector 14 is ensured. Relative movement of first quick couple connector 14 in either a radial direction or an axial direction does not result in leakage of air from stem 12.

First quick couple connector 14 includes a male fitting 30 extending from an end thereof generally opposite from female end 22. Male fitting 30 has a groove 32 allowing positive and detachable coupling with second quick couple connector 16, as will be described in more detail hereinafter. Male fitting 30 also has an outside diameter which is approximately the same as the outside diameter of connection end 18 of stem 12. Thus, a conventional air chuck fitting can likewise be utilized to inflate the tire by pumping air through stem 12.

First quick couple connector 14 includes a valve 34 therein. In the embodiment shown, valve 34 is configured identically to valve 20 within stem 12, but may also be differently configured depending upon the particular application. Valve 34 is in the form of a 90 pound valve core in the embodiment shown.

Second quick couple connector 16 is detachably coupled with first quick couple connector 14 to allow easy attachment and detachment therebetween. More particularly, second quick couple connector 16 includes a slidable collar 36 which is slidable in an axial direction away from first quick couple connector 14 to allow first quick couple connector 14 and second quick couple connector 16 to be coupled together. When first quick couple connector 14 and second quick couple connector 16 are coupled together and collar 36 is released, collar 36 normally is biased to a position toward first quick couple connector 14 which locks quick couple connectors 14 and 16 together. When coupled together, the needle in 90 pound valve core 34 is biased to an open position by second quick couple connector 16 to open the flow path to first quick couple connector 14 and stem 12.

Second quick couple connector 16 also includes an externally barbed fitting 38 generally opposite from collar 36. Barbed fitting 38 provides attachment with an air hose (not shown) which in turn is coupled with a source of air for inflating the tire. For example, barbed fitting 38 may be coupled with an air hose which in turn is coupled with an automatic tire inflation system to maintain the pneumatic tire at a predetermined air pressure level.

Second quick couple connector 16 also includes a valve 40 positioned radially within barbed fitting 38. Valve 40 primarily functions to prevent air leakage through valve stem 12 in the event that the air hose which is coupled with barbed fitting 38 is broken or otherwise leaks. In the embodiment shown, valve 40 is in the form of a 2 pound valve core which opens when a pressure differential of approximately 2 pounds is applied to the upstream side thereof. If the pressure differential falls below 2 pounds, such as in the case of air leakage on the upstream side of barbed fitting 38, valve 40 closes to prevent leakage from the tire through stem 12. Other suitable types of valves which provide the same basic functionality can also be utilized.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A valve stem assembly for use with a pneumatic tire comprising:
 a stem of a pneumatic tire, wherein the stem includes a valve;
 a first connector with a first end, a second end, and a valve, wherein the first end of the first connector is in operative sealing engagement with the stem of the pneumatic tire, wherein the second end of the first connector includes a circumferential groove in an outer surface of the second end of first connector; and
 a second connector with a first end, a second end, and a valve, wherein the first end of the second connector includes a collar slidable in the axial direction with respect to the second connector, wherein the collar is operative to slide between a first position which lockingly engages portions of the first end of the second connector with the groove and a second position which enables the portions of the first end of the second connector to disengage from the groove.

2. The assembly according to claim 1, wherein when the second connector is engaged with the first connector, the second connector is operative to urge the valve of the first connector to open.

3. The assembly according to claim 2, wherein the valve of the first connector includes a needle, wherein when the second connector is engaged with the first connector, the second connector is operative to urge the needle to move relative the second end of the first connector, whereby a fluid flow path through the first connector is opened, wherein when the first connector and the second connector are disengaged, the needle is operative to return to a position which closes the fluid flow path.

4. The assembly according to claim 1, further comprising an axial seal within the first end of the first connector and in sealing engagement with the stem.

5. The assembly according to claim 4, further comprising a radial seal in sealing engagement between the stem and the first connector, wherein the radial seal extends around the stem.

6. The assembly according to claim 5, wherein the stem extends within the first end of the first connector, further comprising a compression nut extending around the radial seal, wherein the compression nut is in releasable connection with the first end of the first connector.

7. The assembly according to claim 1, wherein the second end of the first fitting includes a male fitting, wherein an outer diameter of the second end of the male fitting has a size which about corresponds to a size of an outer diameter of the stem.

8. A valve stem assembly for use with a pneumatic tire comprising:
   a stem of a pneumatic tire, wherein the stem includes a valve;
   a first connector with a first end, a second end, and a valve, wherein the first end of the first connector is in operative sealing engagement with the stem of the pneumatic tire;
   a second connector with a first end, a second end, and a valve, wherein the first end of the second connector is in sealing engagement with the second end of the first connector, wherein the second connector is adapted to engage and disengage with the first connector without the use of tools, wherein the valve of the first connector includes a needle, wherein when the second connector is engaged with the first connector, the second connector is operative to urge the needle of the valve of the first connector to move relative the second end of the first connector to a position which opens a fluid flow path through the first connector, wherein when the first connector and the second connector are disengaged, the needle is operative to move to a position which closes the fluid flow path.

9. The assembly according to claim 8, wherein the second end of the first connector includes a circumferential groove in an outer surface of the second end of the first connector, wherein the first end of the second connector includes a collar slidable in the axial direction with respect to the second connector, wherein the collar is operative to slide between a first position which lockingly engages portions of the first end of the second connector with the groove and a second position which enables the portions of the first end of the second connector to disengage from the groove.

10. The assembly according to claim 9, further comprising:
   an axial seal within the first end of the first connector and in sealing engagement with the stem, wherein the stem extends within the first end of the first connector adjacent the axial seal;
   a radial seal in sealing engagement between the stem and the first connector, wherein the radial seal extends around the stem; and
   a compression nut extending around the radial seal, wherein the compression nut is in releasable connection with the first end of the first connector.

11. The assembly according to claim 9, wherein the second end of the first connector includes a male fitting that is adapted for engagement with an air chuck fitting, whereby an air chuck fitting may be connected to the male fitting of the first connector for use with pumping air through the stem.

12. The assembly according to claim 9, wherein the second end of the second connector includes a barbed fitting adapted for coupling with an air hose, wherein the valve of the second connector is positioned radially within the barbed fitting.

13. The assembly according to claim 9, wherein the second end of the first fitting includes a male fitting, wherein an outer diameter of the second end of the male fitting has a size which about corresponds to a size of an outer diameter of the stem.

14. A method comprising:
   a) mounting a first end of a first connector in sealing engagement with a stem of tire, wherein the stem includes a valve, and wherein the first connector includes a valve; and
   b) mounting a first end of a second connector in sealing engagement with the second end of the first connector, wherein the second connector includes a valve, wherein step (b) includes:
   c) urging with the second connector, the valve of the first connector to open.

15. The method according to claim 14, wherein step (b) includes sliding a collar of the second connector in an axial direction relative the second connector to a position which lockingly engages the second connector with the first connector.

16. The method according to claim 14, wherein in step (b) when the collar is slid relative the second connector, the collar is operative to cause portions of the second connector to engage with a circumferential groove in an outer surface of the second end of the first connector.

17. The method according to claim 14, further comprising:
   d) mounting a hose to a second end of the second connector; and
   e) providing a pressurized gas through the hose, second connector, first connector, and stem.

18. The method according to claim 14, wherein step (a) includes, mounting a compression nut positioned around the stem to the first end of the first connector.

19. The method according to claim 18, wherein step (a) includes compressing at least one seal between the stem and the first end of the first connector.

20. The method according to claim 19, wherein in step (a) the at least one seal includes a seal which extends around the stem.

21. The method according to claim 19, wherein in step (a) the at least one seal includes a seal which extends within the first end of the first connector.

22. A method comprising:
   a) mounting a first end of a first connector in sealing engagement with a stem of tire, wherein the stem includes a valve, and wherein the first connector includes a valve; and
   b) mounting a first end of a second connector in sealing engagement with the second end of the first connector without the use of tools, wherein the second connector includes a valve, wherein step (b) includes:
   c) sliding a collar of the second connector in an axial direction relative the second connector to a position which causes portions of the second connector to lockingly engage with a circumferential groove in an outer surface of the second end of the first connector.

23. The method according to claim 22, wherein step (b) further includes:
   d) urging with the second connector, the valve of the first connector to open.

24. The method according to claim 23, further comprising:
   e) dismounting the second connector from the first connector without the use of tools, wherein step (e) includes:
   f) sliding the collar of the second connector in an opposite axial direction to a position which enables portions of the second connector to disengage from the circumferential groove of the first connector; and
   g) closing the valve of the first connector.

25. The method according to claim 24, wherein in step (a) the second end of the first connector includes a male fitting, further comprising:
  h) engaging an air chuck fitting to the male fitting of the first connector;
  I) providing pressurized gas through the air chuck fitting, first connector and stem.

26. The method according to claim 23, wherein in step (a) the second end of the first fitting includes a male fitting, wherein an outer diameter of the second end of the male fitting has a size which about corresponds to a size of an outer diameter of the stem.

* * * * *